United States Patent

Lauer et al.

Patent Number: 5,566,586
Date of Patent: Oct. 22, 1996

[54] STEERING STICK FOR SWITCHING OR ACTUATING COMPONENTS OF A UTILITY VEHICLE

[75] Inventors: Armin Lauer, Immenstaad; Walter Frei; Alfred Schobinger, both of Friedrichshafen, all of Germany

[73] Assignee: ZF Friedrichshafen AB, Friedrichshafen, Germany

[21] Appl. No.: 256,599

[22] PCT Filed: Feb. 10, 1993

[86] PCT No.: PCT/EP93/00320

§ 371 Date: Jul. 18, 1994

§ 102(e) Date: Jul. 18, 1994

[87] PCT Pub. No.: WO93/15927

PCT Pub. Date: Aug. 19, 1993

[30] Foreign Application Priority Data

Feb. 13, 1992 [DE] Germany .................. 42 04 223.2

[51] Int. Cl.⁶ .................................................. G05G 1/04
[52] U.S. Cl. .................... 74/523; 180/333; 200/61.88
[58] Field of Search ............... 74/492, 523; 180/333, 180/332; 200/61.88, 61.85, 332.2; 273/148 B

[56] References Cited

U.S. PATENT DOCUMENTS 2,348,107   5/1944   Brongersma .
3,022,850   4/1958   Bidwell et al. .................. 180/333
3,941,009   3/1976   Brown .
4,574,651   3/1986   Nordström ...................... 74/523
4,726,442   2/1988   Hansen .
4,921,140   5/1990   Belcham ...................... 200/332.2
5,042,314   8/1991   Rytter et al. ...................... 74/523
5,174,115   12/1992  Jacobson et al. .................. 180/333

FOREIGN PATENT DOCUMENTS 2210787   9/1973   Germany .
3905769   9/1989   Germany .

Primary Examiner—Charles A. Marmor
Assistant Examiner—Sherry Lynn Estremsky
Attorney, Agent, or Firm—Davis and Bujold

[57] ABSTRACT

A steering stick (1) is disclosed for switching or actuating components of a utility vehicle, in particular a wheeled loader. In order to make handling and overview easier for the operator, the stick (1) has a handle (2) ergonomically adapted to the hand. Switching elements (6, 7) within reach of the thumb of the hand that grips the handle (2) are located in the head (3) linked to the handle (2). The switching elements (6, 7) are keys (10 to 13 and 15 to 17) and/or signaling elements, such as luminescent diodes. At least one further key (20) arranged on the back side of the handle (2) allows several keys to be actuated together.

11 Claims, 1 Drawing Sheet

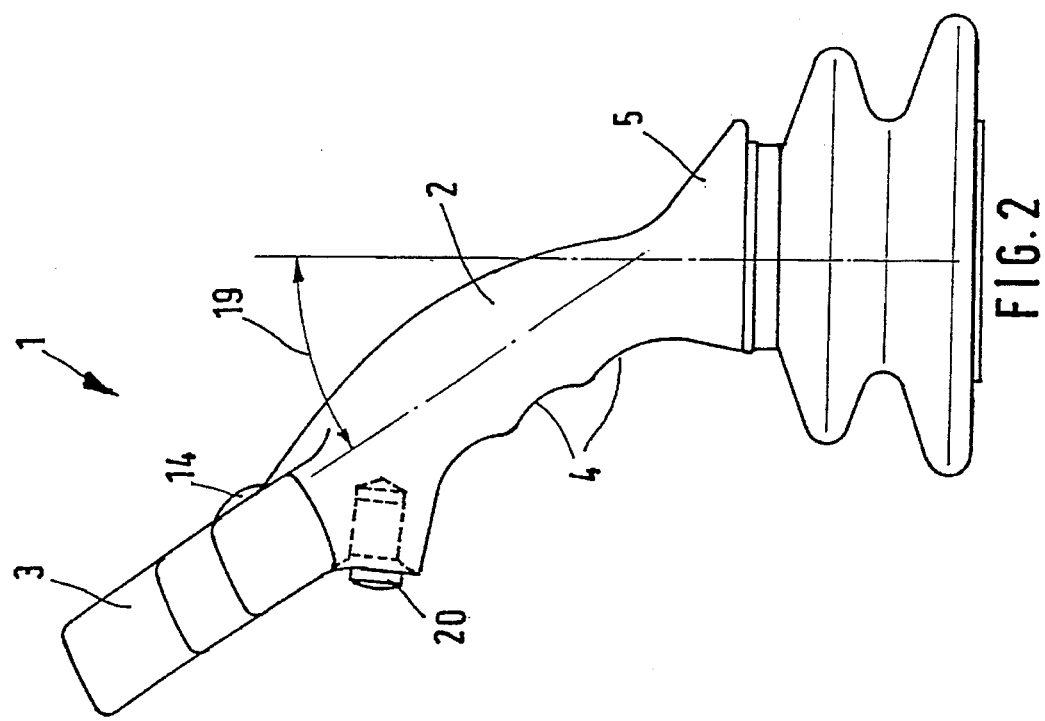
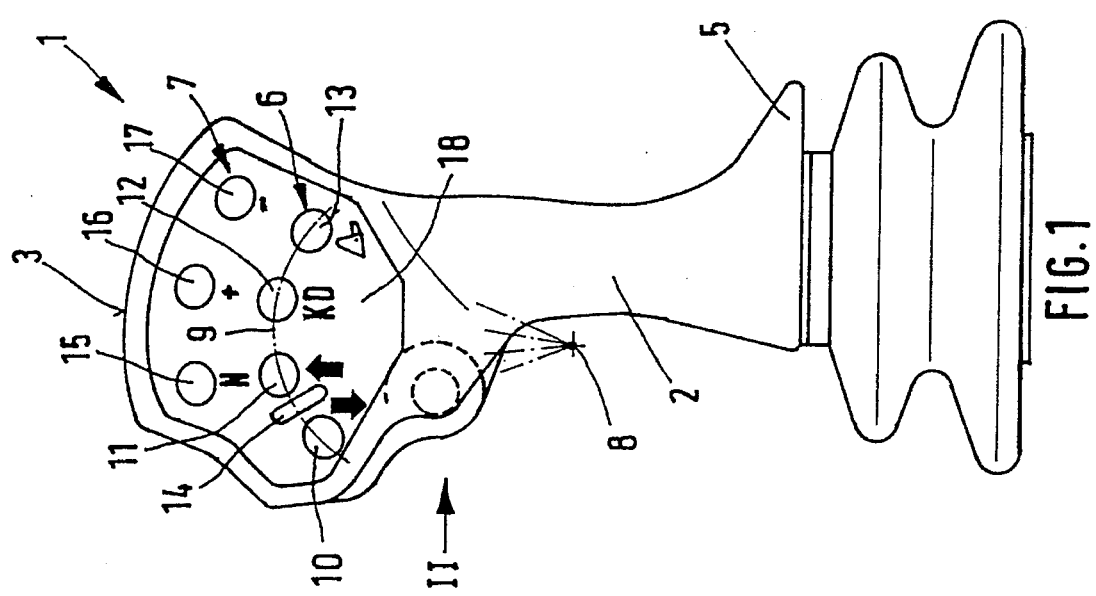

STEERING STICK FOR SWITCHING OR ACTUATING COMPONENTS OF A UTILITY VEHICLE

FIELD OF THE INVENTION

The invention concerns a steering stick for switching or actuating the components of a utility vehicle, for instance. Said vehicle can be a wheeled loader with a working implement situated at the front. The steering stick consists of a handle ergonomically adapted to the hand of the operator. A head is attached to this which houses a switching or signaling element. Said element is actuated with the thumb of the hand.

In well-known working machines such as wheeled loaders, agricultural tractors, harvesters or the like, fatigue is lessened by an ergonomically favorable configuration and arrangement of the operating elements. However, the operating elements in such working machines have as a rule several levers which coordinate quite different functions. In a wheeled loader, for instance, the forward or reverse travel direction is selected via a lever. The individual speed levels are switched via another lever. For actuating the working hydraulics, for instance, in order to lift and tilt the bucket, additional levers are required.

With the multiplicity of existing levers, a high degree of concentration is demanded from the driver. Additionally, such utility vehicles often must work under difficult conditions. Therefore, it is not surprising that the driver quickly tires under such stresses. The danger of errors in operation also exists.

The invention is based on the problem of providing a steering stick for switching or actuating components, especially for utility vehicles (construction and working machines), which ensures a reliable switching and actuating work that is not fatiguing.

SUMMARY OF THE INVENTION

The stated problem is solved by the fact that several switching elements are located in the head of the steering stick in such a manner as to be within reach of the thumb of the hand that grips the handle. With the proposed solution, it is possible to combine all the switching functions or visual signals centrally within the head of the steering stick. This arrangement on the side of the steering stick facing the operator ensures a good overview. The driver does not have to take the hand off the handle of the steering stick for actuating the switching elements. This increases the reliability in operation. Since all functions have to be switched via the thumb-without using the hand—the manipulation is simplified for the driver and accordingly is also less stressful. By a "self-explanatory" arrangement follow according to possible points of view, the danger of an error in operation is practically ruled out.

In a preferred embodiment, the spatial position of a row of first switching elements in relation to the hand is selected so as to be on an arc the radius of which substantially corresponds to the radius of the thumb of the hand gripping the handle. The functions mostly needed can be actuated here by said first switching elements. This selection increases the safety in the manipulation of the steering stick.

Since, in the vehicles in question, in general, comparatively many functions must be taken into account, it is advantageous that a row of additional switching elements be situated on another arc above the row of the first switching elements. It is convenient to coordinate with said switching elements the functions which must be selected or changed comparatively less often. Said switching elements are likewise within the reach of the thumb of the hand gripping the handle. While the first switching elements are to be selected directly by a swiveling motion of the thumb, a slight upward displacement of the thumb is required for actuating the additional switching elements. The operator will find this additional motion hardly disturbing, especially since the frequency of switching is comparatively small for said elements. One of said added switching elements can be, for instance, a key which when actuated, switches the transmission to the neutral position. Two more keys can be provided in order to switch the transmission up or down by one speed level respectively. These features also increase the operational reliability.

Preferably, the row of the first switching elements contain those which are frequently actuated. These can be, for instance, keys with which the forward or reverse travel direction is switched. Conveniently, there is a further key which steps down (kick-down) by one speed level. Finally, from the point of view of safety, there is a valuable key which, upon actuation, produces a transfer of the working implement such as a bucket to a middle position.

To illustrate the functions corresponding to the switching elements, it has proved convenient to place key symbols corresponding to the switching elements on a replaceable support. The support can be, for instance, a self-adhesive foil or a snap-on plate which, by color, is distinguished from the remaining part of the steering stick. This improves the overview. When the keys are engaged in other functions, the support can be easily removed and exchanged for another support having the symbols that now apply.

In order to change the functions coordinated with the switching elements, the steering stick is connected to a electronic control system which can be freely programmed.

An additional safety measure against operation errors is obtained in an especially simpled manner by situating a tangible limiter between two adjacent switching elements. Said tangible limiter can be, for instance, a web or a rib which distinctly rises from the surface of the support. When the operator changes the thumb from one switching element to another switching element, said change is additionally indicated by said tangible limiter. This feature increases the tactile reliability of the steering stick.

When the steering stick is tiltably mounted by pressing and drawing, additional functions can be switched. This tilting movement actuates, for instance, the hydraulics for actuating the bucket arms. The bucket is tilted forwardly when the steering stick is pressed and viceversa. The steering stick is designed so as to be attachable to another control unit such as the hydraulics.

From an ergonomic point of view, a forward inclination of the steering stick—seen in sideview—within a range of about 15 to 30 degrees with respect to the vertical has proved especially favorable. This feature also contributes to enabling the operator's hand to grip the steering stick for a long period of time without fatigue.

For safety reasons a combined actuation of switching elements (keys) has provided to be very convenient. In this application, it is particularly advantageous if at least one key is placed on the rear side of the head of the steering stick, remote from the other switching elements. This key is actuated with the index finger of the hand. The combined actuation of the thumb and the index finger of the hand actuates, for safety reasons, a separate function, such as, for instance, starting from the parked position.

It is also advantageous if, at least two signaling elements which visually indicate the selected direction of travel air are placed on the head of the steering stick. Said signaling elements can be, for instance, luminescent diodes of different colors. Background lighted fields formed by reflectors of different colors, for instance, are also conceivable.

It is, of course, possible and within the scope of this invention that one or more of the switching elements can be exchanged for signaling elements. Therefore, it is easily possible, for instance, to exchange a key for a luminescent diode. The key itself can also be designed as luminescent key. Any desired combination of luminescent diodes, luminescent keys, or separate signal areas is also obviously possible.

BRIEF DESCRIPTION OF THE DRAWINGS

Other features essential to the invention and the advantages resulting therefrom can be understood from the explanation that follows of an embodiment of the invention with reference to the drawings.

In the drawings:

FIG. 1 shows in simplified form a steering stick for switching or actuating components of a utility vehicle;

FIG. 2 shows the steering stick of FIG. 1 seen in sideview.

DETAILED DESCRIPTION OF THE PREFERRED EMBODIMENTS

In FIG. 1 a steering stick 1 is reproduced in front view and as detailed as necessary for the understanding of this invention. The steering stick is meant to be used on a utility vehicle such as a wheeled loader. The remaining parts of said utility vehicle are not reproduced themselves. In the instant case, the front view means the line of vision in forward travel direction. The steering stick serves to switch or actuate components of the wheeled loader. The transmission, for instance, is also switched. The actuated component in this case is a working implement in the form of a hydraulically actuated bucket situated in front of the wheeled loader.

The characteristic main components of the steering stick 1 consist of a handle 2 and a head 3 situated above. The handle 2 is ergonomically adapted to a hand not reproduced itself. In addition, said handle is provided with depressions 4 on its rear side (see FIG. 2). The handle 2 converts to a substantial collar-shaped seat 5 for the ball of the hand in its lower area.

A row of first switching elements 6 and a row of additionally switching elements 7 is located in the head 3. Both rows of switching elements are disposed in the head 3 so as to be within reach of the thumb of the hand gripping the handle 2. The position of the joint of the thumb is indicated with the numeral 8.

Together with the fact that all switching elements 6 and 7 are within reach of the thumb, the spatial arrangement of the lower switching elements 6 is such that they lie substantially upon an arc 9, the radius of which substantially corresponds to the radius of the thumb of the hand gripping the handle. The switching elements 6 consist of a key 10 for forward travel direction, an exactly adjacent key 11 for reverse travel direction, a key 12 for step down (kick-down) of the transmission by one speed level and another key 13 for moving the working implement (bucket) to a middle position.

A tangible limiter 14 is located between keys 10 and 11 for forward and reverse travel directions.

Depending on the requirements, the keys 10 to 13 can be opening, closing, or chain keys.

The additional switching elements 7 lie upon another arc above the switching elements 6. Said switching elements consists of a key 15 for switching the neutral position of the transmission and two keys 16 and 17 for selecting the speed level by stepping the transmission up or down.

Keys 10 to 13 and 15 to 17 have conveniently coordinated symbols (arrows for travel direction ahead or in reverse, bucket for working implement, plus and minus for a higher or lower speed level, N for neutral position and KD for kick-down). These symbols are situated on a replaceable support 18. The support 18 can be a self-adhesive foil or a snap-on plate which stands out by color from the remaining components of the steering stick and upon which the symbols are imprinted. The replaceable foil or plate proves to be especially practical, since other functions can be coordinated with the keys as needed by a freely programmable control electronic system not reproduced in the drawings. In case of reversal of the key functions the foil/plate can easily be removed and exchanged for a new one.

From the sideview corresponding to FIG. 2 it is shown that the steering stick is forwardly inclined (in travel direction) forming an angle 19 in the range of about 15 to 30 degrees with respect to the vertical. This inclination is advantageous for ergonomic reasons. At least one other key 20, which is actuated with the index finger of the hand, is located on the rear side of the steering stick remote from the switching elements 6 and 7. The key 20 makes possible a combined actuation of keys such as may be necessary, especially for safety reasons.

It can further be seen from the front view of FIG. 1 that the steering stick has the shape of a claw. A relatively large number of switching elements can be housed in the head of the steering stick so as to be all within reach of the thumb of the hand gripping the handle. The switching elements 6 and 7 can be replaced or also complemented by visual indications. For instance, it is possible to use luminescent body such as a luminescent diode, which signals a certain condition of operation instead of a key. Of course, any convenient combination is possible here. Thus, for instance, luminescent fields or background lighted luminescent keys can provide additional visual indication.

| Reference numerals |
| --- |
| 1 steering stick |
| 2 handle |
| 3 head |
| 4 handle depressions |
| 5 seat |
| 6 switching element |
| 7 switching element |
| 8 position of the joint of the thumb |
| 9 arc |
| 10 key |
| 11 key |
| 12 key |
| 13 key |
| 14 limiter |
| 15 key |
| 16 key |
| 17 key |
| 18 support |
| 19 angle |
| 20 key |

We claim:

1. A steering stick (1) for switching and actuating components of a utility vehicle comprising:

a handle (2) ergonomically adapted to a hand and having a head (3) with switching elements (6, 7) arranged so as to be within reach of a thumb of a hand gripping said handle (2);

wherein a first row of first switching elements (6) is spatially positioned with respect to said handle (2) such that the first switching elements (6) lie substantially in a first arc (9) having a radius substantially corresponding to the radius of a thumb of a hand gripping said handle (2);

a second row of additional switching elements (7) is arranged in a second arc spatially positioned with respect to said handle (2) adjacent the first row of said first switching elements (6), relative to a thumb of a hand gripping said handle (2);

said first switching elements (6) consist of a plurality of keys (10, 11, 12, 13) for: traveling forward, traveling in reverse, stepping down by one gear and moving a working implement to a predetermined position, respectively, and said additional switching elements (7) consist of a plurality of keys (15) for: switching to a neutral position of a transmission, stepping the transmission up and stepping the transmission down, respectively; and signaling elements are placed on said head (3) of said steering stick (1) for visual indication of actuation of said switching elements.

2. A steering stick according to claim 1, wherein functions of said switching elements (6, 7) are selectively programmed by a variably programmable electronic control system to correspond to the functions designated by a replaceable support mounted to said head.

3. A steering stick according to claim 1, wherein a tangible limiter (14) is placed between at least one of two adjacent first and two adjacent additional switching elements (10, 11) as a safety against erroneous operation of said at least one of two adjacent first switching elements and two adjacent additional switching.

4. A steering stick according to claim 1, characterized in that said steering stick (1) is tiltable by pressing and drawing.

5. A steering stick according to claim 1, characterized in that said steering stick (1) is forwardly inclined by about 15 to 30 degrees with respect to the vertical.

6. A steering stick according to claim 1, characterized in that at least one key (20) which is actuated with the index finger of the hand is located on the rear side of said steering stick (1) remote from said switching elements (6, 7).

7. A steering stick according to claim 1, characterized in that a substantially collar-shaped seat (5) for a ball of the hand is located at the lower end of said handle (2).

8. A steering stick (1) for switching and actuating components of a utility vehicle comprising;

a handle (2) ergonomically adapted to a hand and having a head (3) with switching elements (6, 7) arranged so as to be within reach of a thumb of a hand gripping said handle (2);

wherein a first row of first switching elements (6) is spatially positioned with respect to said handle (2) such that the first switching elements (6) lie substantially in a first arc (9) having a radius substantially corresponding to the radius of a thumb of a hand gripping said handle (2);

a second row of additional switching elements (7) is arranged in a second arc spatially positioned with respect to said handle (2) adjacent the first row of said first switching elements (6), relative to a thumb of a hand gripping said handle (2);

said first switching elements (6) consist of a plurality of keys (10, 11, 12, 13) for: traveling forward, traveling in reverse, stepping down by one gear and moving a working implement to a predetermined position, respectively, and said additional switching elements (7) consist of a plurality of keys (15) for: switching to a neutral position of a transmission, stepping the transmission up and stepping the transmission down, respectively, and symbols designating the functions corresponding to said keys (10 to 13 and 15 to 17) are placed upon a first replaceable support (18) mounted to said head; and at least a second replaceable support, for mounting to said head in place of said first replaceable support, contains symbols designating functions corresponding to said keys that, for at least one of said keys, is different than the function designated by said first replaceable support.

9. A steering stick according to claim 8, wherein said replaceable supports each comprise one of a removable rigid plate and a removable adhesive foil.

10. A steering stick (1) for switching and actuating components of a utility vehicle comprising:

a handle (2) ergonomically adapted to a hand and having a head (3) with a first arc of first switching elements (6) spatially positioned on said head (3) with respect to said handle (2) such that the first arc (9) has a radius substantially corresponding to a radius of a thumb of a hand gripping said handle (2), and a second arc of additional switching elements (7) spatially positioned with respect to said handle (2) along a second arc located on a side of said first arc, remote from a thumb of a hand gripping said handle (2), substantially concentric with the first arc;

wherein said first switching elements (6) consist of a separate key (10, 11, 12, 13) for each of the following functions: traveling forward, traveling in reverse, stepping a transmission of the utility vehicle down by one gear and moving a working implement to a predetermined position; and said additional switching elements (7) consist of a separate key (15) for each of the following functions: switching to a neutral position of the transmission, stepping the speed level up (16) and stepping the speed level down (17);

a first replaceable support (18), for attachment to the head (3) of said steering stick (1), contains symbols thereon indicating the functions of corresponding said keys (10 to 13 and 15 to 17) and at least a second replaceable support, for attachment to the head (3) of said steering stick (1), contains symbols thereon indicating a different function for at least one of said keys (10 to 13 and 15 to 17); and a variably programmable electronic control system, for, upon attachment of one of said replaceable supports to the head (3) of said steering stick (1), programming the functions of said keys (10 to 13 and 15 to 17) to correspond to the functions indicated by said replaceable support attached to the head (3) of the steering stick (1).

11. A steering stick (1) for switching and actuating components of a utility vehicle comprising:

a handle (2) ergonomically adapted to a hand and having a head (3) with a first arc of first switching elements (6) spatially positioned on said head (3) with respect to said handle (2) such that the first arc (9) has a radius substantially corresponding to a radius of a thumb of a hand gripping said handle (2), and a second arc of additional switching elements (7) spatially positioned with respect to said handle (2) along a second arc concentric to said first arc and located on a side of said first arc remote from a thumb of a hand gripping said handle (2);

wherein said first switching elements (6) consist of a key (10, 11, 12, 13) for each of the following functions: traveling forward, traveling in reverse, stepping a transmission of the utility vehicle down by one gear and moving a working implement to a predetermined position; and said additional switching elements (7) consist of a key (15) for each of the following functions: switching to a neutral position of the transmission, stepping the speed level up (16) and stepping the speed level down (17); and signal elements are located on said head (3) of said stick (1) for visual indication of actuation of said switching elements.

* * * * *